United States Patent
Leblond et al.

(10) Patent No.: US 7,336,736 B2
(45) Date of Patent: Feb. 26, 2008

(54) METHOD OF DETECTING AND PROCESSING PULSED SIGNALS IN A RADIO SIGNAL

(75) Inventors: Valéry Leblond, Valence (FR); Franck Letestu, Bourg de Peage (FR); Alain Renard, Chabeuil (FR)

(73) Assignee: Thales, Paris (FR)

( * ) Notice: Subject to any disclaimer, the term of this patent is extended or adjusted under 35 U.S.C. 154(b) by 425 days.

(21) Appl. No.: 10/250,758

(22) PCT Filed: Nov. 26, 2002

(86) PCT No.: PCT/FR02/04044

§ 371 (c)(1),
(2), (4) Date: Jul. 29, 2004

(87) PCT Pub. No.: WO03/046602

PCT Pub. Date: Jun. 5, 2003

(65) Prior Publication Data

US 2004/0258178 A1    Dec. 23, 2004

(30) Foreign Application Priority Data

Nov. 27, 2001    (FR) .................................. 01/15319

(51) Int. Cl.
*G01R 23/14* (2006.01)

(52) U.S. Cl. .................. 375/342; 375/237; 375/238; 375/147; 375/340; 375/316; 375/348; 375/353; 375/239; 342/20; 329/311; 329/312; 329/313

(58) Field of Classification Search ................ 375/239, 375/237, 238, 342, 147, 340, 316, 348, 353; 340/20; 329/311, 312, 313
See application file for complete search history.

(56) References Cited

U.S. PATENT DOCUMENTS

| 4,870,424 | A | * | 9/1989 | Lalezari et al. ............. 342/379 |
|---|---|---|---|---|
| 5,410,750 | A | * | 4/1995 | Cantwell et al. ............ 455/306 |
| 5,596,600 | A | | 1/1997 | Dimos et al. |
| 5,694,435 | A | * | 12/1997 | Kolle et al. ................. 375/342 |
| 5,781,152 | A | | 7/1998 | Renard et al. |
| 5,822,376 | A | | 10/1998 | Renard |
| 5,850,420 | A | | 12/1998 | Guillard et al. |
| 6,081,691 | A | | 6/2000 | Renard et al. |
| 6,317,078 | B1 | | 11/2001 | Renard et al. |
| 6,345,177 | B1 | | 2/2002 | Renard et al. |
| 6,529,566 | B1 | * | 3/2003 | Carsello et al. ............. 375/340 |

FOREIGN PATENT DOCUMENTS

EP    0 583 967 A    2/1994

OTHER PUBLICATIONS

Abimoussa et al; "Anti-Jamming Solution to Narrowband CDMA Interference Problem"; 2000 Canadian Conference on Electrical and Computing Engineering. Conference Proceeding. Navigation to New Era (Cat. No. 00TH8492); pp. 1057-1062, vol. 2, XP002214232.

* cited by examiner

*Primary Examiner*—Chieh M. Fan
*Assistant Examiner*—Aristocratis Fotakis
(74) *Attorney, Agent, or Firm*—Lowe, Hauptman, Ham & Berner, LLP

(57) ABSTRACT

The invention allows the detection and processing in a radio signal received by a receiver, of any signal of "pulsed" type present in radio signals applied to the input of a radiofrequency receiver, the receiver having an analogue/digital converter for performing the coding into digital on N bits of P successive samples of the analogue signal applied to the input of the receiver and a computer for processing the said digital signals, characterized in that on the basis of a histogram of the rate of occupancy of the digitized samples, graded in ranges Fx of amplitude-increasing sample levels, is determined, from among the ranges Fx, a range Fn onwards of which the total number of digitized samples Nnor contained in the ranges Fn and those below Fn is greater than or equal to a normality threshold Nn, Nn being a number predetermined as a function of the sensitivity of the detection of pulsed signals that one wishes to achieve.

13 Claims, 3 Drawing Sheets

METHOD OF DETECTING AND PROCESSING PULSED SIGNALS IN A RADIO SIGNAL

The invention allows the detection and processing in a radio signal received by a receiver, of any signal of "pulsed" type.

Furthermore, within the framework of systems for detecting and resisting interference of satellite navigation receivers, the method according to the invention makes it possible to detect the pulsed interference but also to reduce the effects thereof.

Today, pulsed signals and especially pulsed interference represent, in particular for GPS ["Navstar Global Positioning System"], applications, a major difficulty in protection against interference. Specifically, one of the problems raised by the transmission of data by radio signals with spread spectrum, such as those of GPS signals, is the sensitivity of the receivers to jammers given the low powers involved and the considerable distances separating the transmitters and the receivers.

The signal in the frequency bands for GPS is obtained by modulating a carrier with a first signal producing a first modulation spectrum of a width of the order of 2 MHz and with a second signal producing a second modulation spectrum with a width of the order of 24 MHz. These frequency bands for GPS (L5) or for GALILEO (E5) may be disturbed by pulse type signals originating for example from civil distance measuring equipment or "DME", between an aeroplane and a ground beacon.

The DME signal comprises two pulses of specified shapes spaced a few microseconds apart. The beacon is recognized by the aircraft interrogating the beacon, by the frequency of the pulse transmitted by the beacon.

The frequency gaps of the signals transmitted by the beacons are spaced 1 MHz apart.

The GPS receiver, owing to its considerable geographical coverage by its antenna pattern, randomly receives in its frequency band a multitude of pulsed signals originating from several beacons interrogated by various aircraft. These frequencies transmitted at different instants and at frequencies spaced 1 MHz apart, cause a degradation of the signal-to-noise ratio of the GPS receiver and consequently the measurement errors.

In the general case, the effects of the interference of the pulsed signals on the receivers depend on numerous factors among which may be mentioned, the peak power, the duty ratio, the pulse width.

GPS receivers in particular work with very low reception levels of the order of −130 dBm, i.e. around 30 dB beneath the noise floor of the receiver. The type of coded digital modulation used in GPS receivers allows extraction of the useful signal for these weak reception levels. Under these conditions of very weak power received, a pulse of weak level at the input of the GPS receiver, of the order of 30 dB above the noise floor, may produce the saturation of the radiofrequency input stages and the saturation of the analogue/digital converter of the receiver.

There are currently numerous devices and procedures using anti-interference processing that make it possible to detect and eliminate from a signal received, continuous (non-pulsed) interference in such a way as to recover at the output of the receiver a purified signal usable by a standard GPS receiver. Among these procedures may be mentioned that consisting in modifying the radiation pattern of the reception antenna so as to create a reception trough (or a zero) in the direction of the sources of disturbance, a technique known by the name "Controlled Reception Pattern Antenna" or CRPA for short.

Most of the other procedures are based on estimations that are all the more accurate when they are carried out over relatively long durations for which the interference is present.

Another procedure consists in detecting the pulse and in switching off the receiver for the duration of the pulse ("pulse blanking"). The drawback of this procedure is that if the pulses are numerous over a considerable duration the receiver, frequently switched off, receives little useful signal, thereby giving rise to considerable measurement errors.

These procedures exhibit major drawbacks, on the one hand, they are poorly suited to intermittent interference and on the other hand, in order to operate in this latter exemplary case, they require that the interference be observed over a sufficiently long time interval, and in particular, that the interference be geographically stable, which is not the case for on-board GPS receivers.

In order to alleviate the drawbacks of the anti-interference procedures of the prior art, the invention proposes a method of detecting and processing pulsed signals present in radio signals applied to the input of a radiofrequency receiver, the receiver having an analogue/digital converter for performing the coding into digital on N bits of a packet K of P successive samples of the analogue signal applied to the input of the receiver and a computer for processing the said digital signals, characterized in that on the basis of a histogram of the rate of occupancy of the digitized samples, graded in ranges $F_x$ of amplitude-increasing sample levels, is determined, from among the ranges $F_x$, a range $F_n$ onwards of which the total number of digitized samples Nnor contained in the ranges $F_n$ and those below $F_n$ is greater than or equal to a normality threshold $N_n$, $N_n$ being a number predetermined as a function of the sensitivity of the detection of pulsed signals that one wishes to achieve.

For this purpose, the computer performs at least the following operations:

counting of the number of samples $N_y$ per range $F_x$ of amplitude-increasing sample levels, x being an integer lying between 1 and m, the entirety of the samples of the packet K of P samples being stowed in at least one of the ranges $F_x$ of levels of the samples;

determination, from among the ranges $F_x$ of sample levels, of a range $F_n$, n lying between 1 and m, onward of which the total number of samples lying in the ranges $F_1$ to $F_n$ exceeds a predetermined value $N_n$ of samples;

counting of the total number of samples $N_d$ in the ranges of increasing levels beyond a range of levels $F_d$ which is such that:

$F_d = F_n + \Delta F$, $\Delta F$ being a margin or a positive deviation of a number of ranges of sample levels with respect to the range $F_n$;

comparison of the total number of samples $N_d$ with a samples threshold $N_{max}$ from which is determined the presence or the absence of a pulsed signal in the signal received: if $N_d \geq N_{max}$ the signal received comprises a pulsed signal, if $N_d < N_{max}$ the signal received does not contain any pulsed signal.

A first objective of the method according to the invention is to detect, on the basis of digitized samples of the radio signal received, the presence of a pulsed signal at the input of the receiver. For this purpose, in a first phase of the method according to the invention, the detection of a range of sample levels corresponding to the presumed undisturbed signals, which we will call the normality range (range Fn), is performed. This range Fn will be characterized by samples of low amplitude with respect to the amplitude of the samples of pulsed signals and to the capacity of the analogue/digital converter. This normality range Fn is determined by summing the samples, onwards of the range of lowest level (range F1), that are contained in the ranges of increasing levels and by comparing the total number of samples in these ranges with a predetermined value Nn of presumed undisturbed samples, for example, with a value close to the number P of samples of the packet of digitized samples. The range Fn is that onwards of which the total number of samples exceeds the predetermined number Nn.

FIG. 1 shows a histogram of the principle of location of the samples in the ranges Fx according to the invention.

Another objective of the invention is to remove the action of the pulsatile signals on the useful signal at the output of the receiver when the presence of pulsatile signals are detected. For this purpose the invention proposes that the digital samples at the input of the receiver be brought down to values close to those that they would take if the signal at the radiofrequency input of the receiver were a "continuous" radiofrequency signal undisturbed by a pulsed signal.

The method, according to another characteristic of the invention, consists in clipping the entirety of the digitized samples Nd counted in the ranges beyond the range of levels Fd, that we shall call the detection rank, as defined previously, to a lower number of bits than those that can be supplied by the digital/analogue converter of the receiver, for example to a number of bits which is close to those of the samples counted in the normality range Fn.

The invention will be better understood with the aid of detailed description of the methods according to the invention with reference to the appended drawings, in which:

FIG. 1 already described shows a histogram of the principle of location according to the invention of the samples in the ranges of levels Fx.

The invention is based on the fact that the signals in any standard receiver and in particular in the case of GPS but more generally for most areas in which radio signals are used, are at a given moment of the processing converted from analogue to digital and are therefore coded on a certain number N of bits.

Figure 1:
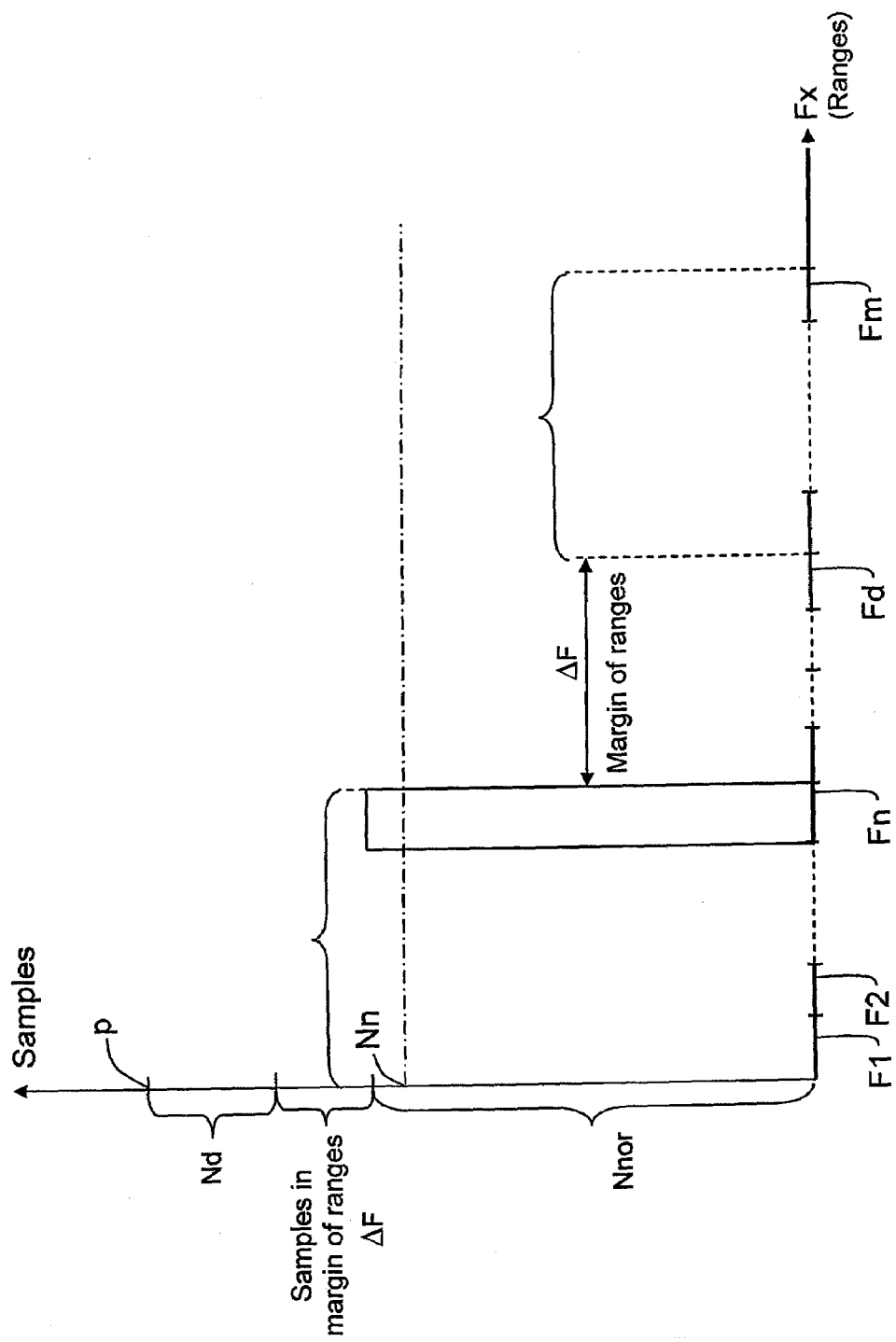
Figure 2:
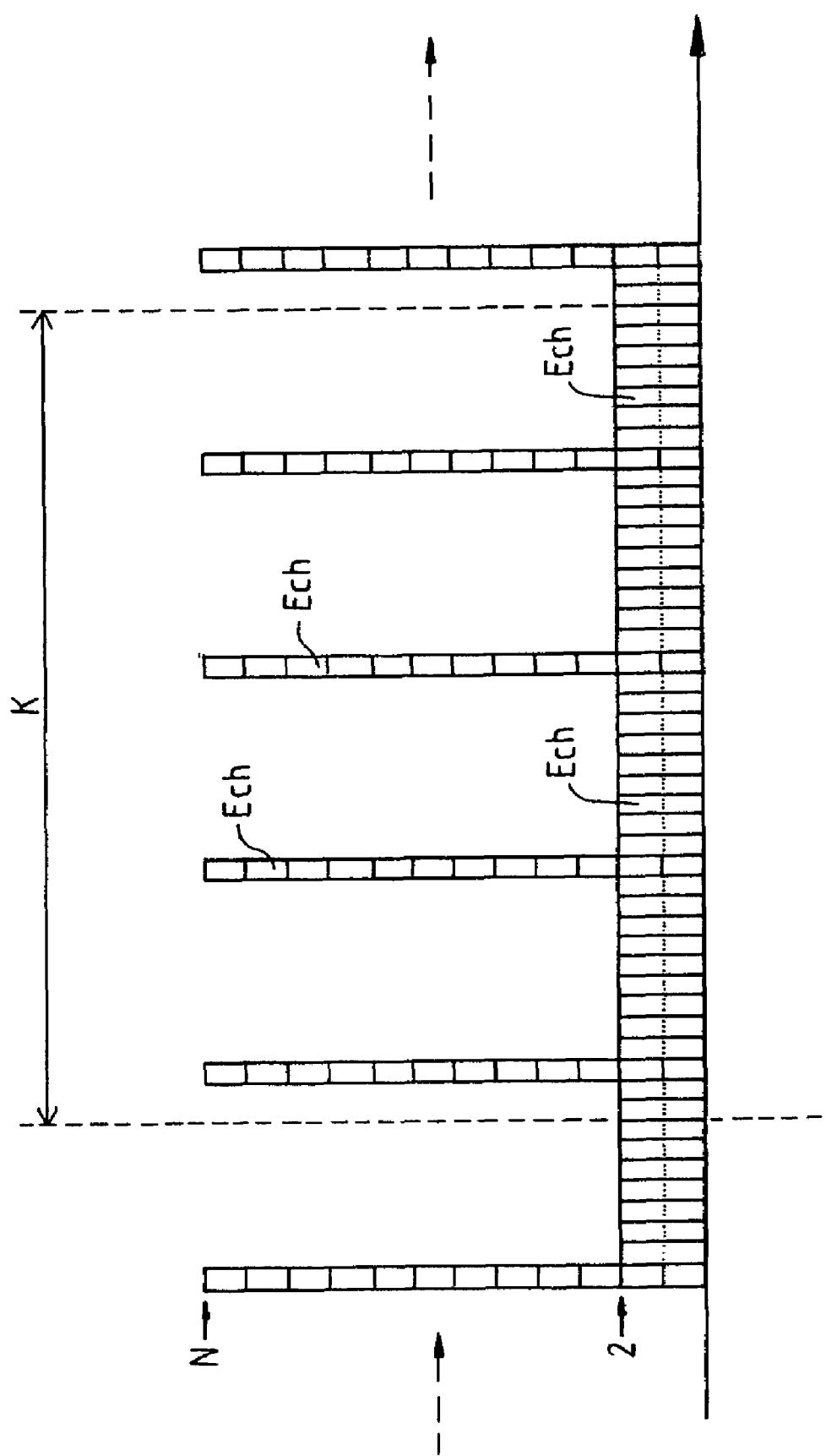
FIG. 2 represents a packet K of P samples quantized on N bits of the received signal.

FIG. 2 represents a string of samples Ech quantized on N bits of the radio signal received by the receiver. In the example of FIG. 2, most of the time, the highest bit occupied is the second bit, except for 10% of the time where it is in fact the last bit of highest weight that is occupied.

The principle of the invention lies in the fact that in an interference-free configuration (that is to say one without pulsed signals), the signal is coded at the bottom of the coding scale, let us say on the two or three bits of the bottom of the scale (little input power).

When a pulsed signal, mostly strong, or even saturating in respect of the coder of the receiver, is present in the signal received, the entirety of the signal is then coded over the set of coding bits and the bit of highest weight, corresponding to a sample containing this pulsed signal, is generally situated at the top of the coding scale, i.e. the Nth or the Nth-1 bit.

Figure 3:
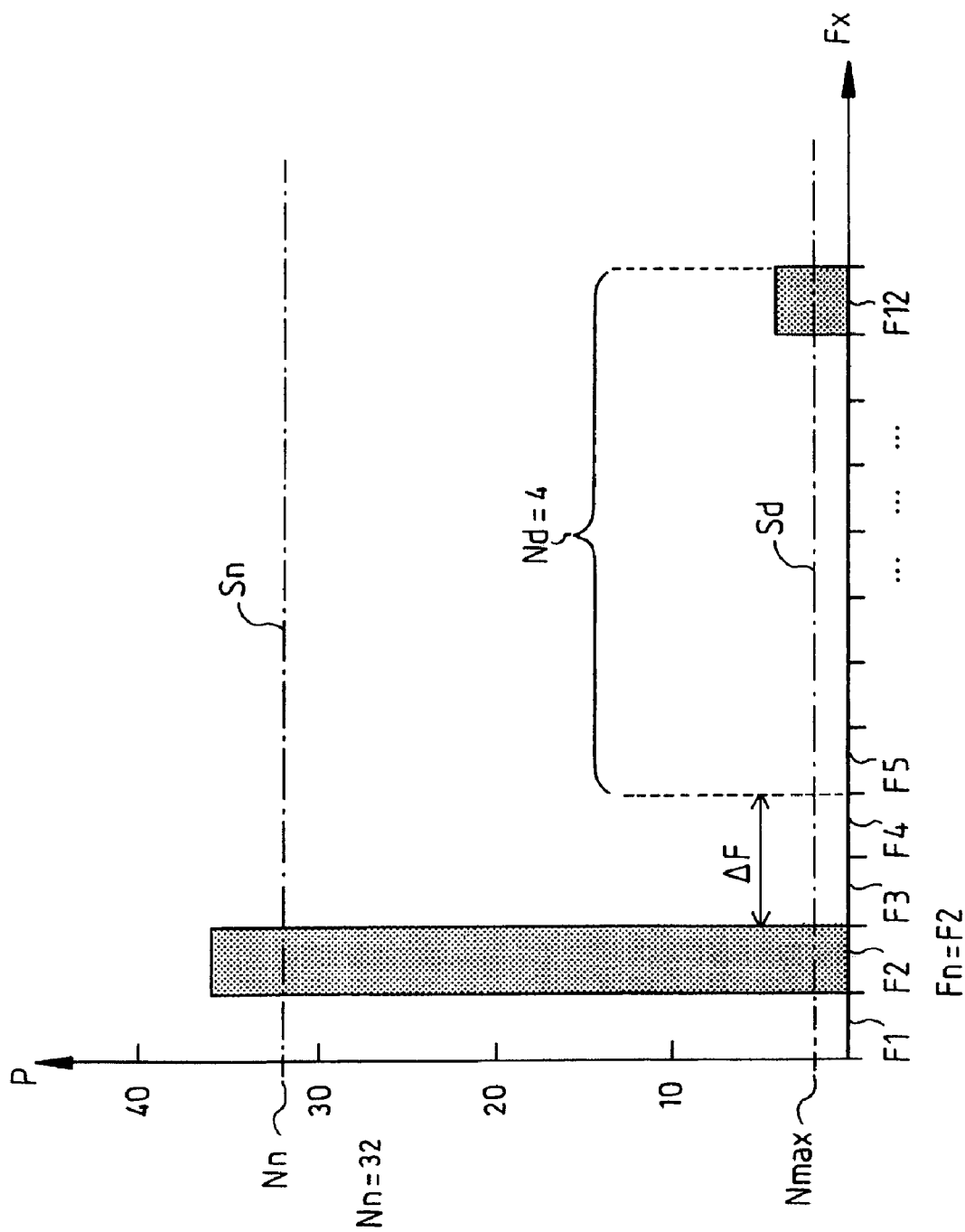
FIG. 3 represents a histogram of location of the bits of highest weight according to the invention of the packet K of FIG. 2.

FIG. 3 represents a histogram of location of the bits of highest weight according to the invention of the packet K of P samples of FIG. 2. The P samples are coded by a 12-bit coder (N=12). The sampled signal comprises a pulsed signal with a cycle rate of 10% and with period 10/Fe where Fe is the sampling frequency of the coder of the receiver.

Let us consider for example a packet K of 40 successive samples Ech (P=40). The principle of the invention is to effect for each packet K considered of P samples (zone between dashes in FIG. 2) a count or a histogram of the place occupied by the samples in brackets of predetermined levels. To simplify the explanation we shall consider in this example that the grading of a sample in the level ranges is performed by taking account only of the highest weight of the digitized sample without taking account of the bits of lower weight.

The result of this first count, corresponding to the coding of the samples of FIG. 2, is given by FIG. 3 representing a histogram comprising 12 ranges of levels (F1 to F12) as abscissa corresponding to the location of the number of samples having the same bit of highest weight. In this example, the packet K of P samples comprises 36 samples, whose bit of highest weight is equal to 2, i.e. occupying the range of level F2, and 4 samples whose bit of highest weight is equal to 12 (N=12), i.e. the range of levels F12.

The range of levels Fn, that we shall call the normality rank, onwards of which a certain percentage Sn of the P samples considered is found, is determined on the basis of this histogram. Sn, which we shall call the normality threshold, being a number predetermined as a function of the sensitivity of the detection of pulsed signals that one wishes to achieve. In this example, we choose Sn=80%, i.e. in the example of FIG. 3, this normality threshold corresponds to 32 samples out of the total of 40, i.e Fn=32.

Starting from the normality rank Fn (or level range Fn), we move away by ΔF level ranges (margin) and we observe the quantity of samples graded beyond a number of ranges of sample levels Fd=Fn+ΔF. We shall call the range Fd the detection rank. If the entirety of the samples Nd graded beyond the detection rank Fd is greater than a second threshold Sd, that we shall call the detection threshold, in percent of the P samples (5% for example), then the coded signal is considered to contain an intermittent component that has to be processed by a specific method that we shall describe later. On the other hand if the second threshold Sd is not exceeded, the coded signal will be considered to contain only "continuous" components which will be processed by conventional methods.

In the example of FIG. 3, Sd having been chosen at 5% of the samples i.e. 2 samples and since the total number Nd of samples contained in the ranges of levels beyond Fd is four (i.e. 10% of the total of samples), the coded signal is considered to contain an intermittent component.

In cases where the second detection threshold Sd is exceeded, that is to say that the presence of samples of a pulsed signal has been detected, the samples Nd are brought down, at the output of the processing, to the bottom part of the histogram i.e. to levels which will make it seem that the coded signal now contains only "continuous" components. For this purpose, it is sufficient to clip the entirety of the samples Nd to a lower number of bits, close to the number of bits of the samples of the normality rank Fn, i.e. for example those of Fn or Fn+1.

In this way, let us imagine that in this example of FIG. 3, the signal received consists of the GPS signal embedded in thermal noise coded on the first two bits (bottom bits in FIG. 3) and of the intermittent signal with cycle rate 10% and period 10/Fe. If one proceeds according to the invention, the samples Nd of the pulsed signals will be brought down to the level of the thermal noise by programmable saturation.

The output signal, after processing according to the invention, will consist of 90% of samples coded properly, that is to say with a signal actually received, (i.e. 36 samples out of 40 in the example of FIG. 3), and of the samples coded improperly, (i.e. 4 samples out of 40 in the example of FIG. 3), that is to say brought down to the level of noise but in every case much less powerful than the original pulsed signals and hence less disturbing in respect of stages of the standard GPS receiver.

The processing described in accordance with the method according to the invention is carried out for example with the aid of computational circuit in a known manner. For example the packets K of P digitized samples to be processed can be stored in a memory of the computer which will perform the computational operations required for the determination of the presence or of the absence of pulsed signals as a function of the various thresholds Sn and Sd chosen as described previously. The computer can comprise a program comprising a string of instructions performing the various operations required for the conduct of the method according to the invention. Through their great computational speed, recent computers allow real-time signal processing.

The use of the method of detecting and processing pulsed signals according to the invention make it possible to reduce the loss of the signal-to-noise ratio due to the presence of such disturbing sources at the input of a GPS receiver to a level of the order of 10% of the initial power, i.e. by 1 dB after processing, whereas without processing the presence of an intermittent jammer coded on 10 bits above the thermal noise, i.e. an INR of 60 dB would have given rise to a loss of signal-to-noise ratio of the order of this INR, i.e. 60 dB.

Finally, today, pulsed interfering generators are found on the market at relatively low price levels, thereby making an intentional jamming threat entirely realistic.

The invention claimed is:

1. A method of detecting and processing pulsed signals present in radio signals applied to the input of a radiofrequency receiver, the receiver having an analog to digital converter for performing the coding into digital on N bits of a packet K of P successive samples of the analog signal applied to the input of the receiver and a computer for processing the said digital signals, the method comprising the steps of:
grading of successive samples in amplitude- increasing ranges Fx of samples levels, x being an integer lying between 1 and m;
counting the number of samples Ny per range Fx of amplitude-increasing sample levels, the entirety of the samples of the packet K of P samples being stowed in at least one of the ranges Fx of levels of the samples;
determining, from among the ranges Fx of sample levels, of a range Fn, n lying between 1 and m, onward of which the total number of samples Nnor lying in the ranges F1 to Fn exceeds a predetermined value Nn of samples;
counting of the total number of samples Nd in the ranges of increasing levels beyond a range of levels Fd which is such that:
Fd=Fn+ΔF, ΔF being a margin or a positive deviation of a number of ranges of sample levels with respect to the range Fn;
comparing the total number of samples Nd with a samples threshold Nmax from which is determined the presence or the absence of a pulsed signal in the signal received:
if Nd≧Nmax the signal received comprises a pulsed signal, if Nd<Nmax the signal received does not contain any pulsed signal.

2. The method of detecting and processing pulsed signals according to claim 1, wherein the entirety of the digitized samples Nn counted in the ranges beyond the range of levels Fx are clipped to a lower number of bits than those that can be supplied by the digital to analog converter of the receiver.

3. The method of detecting and processing pulsed signals according to claim 2, wherein the entirety of the digitized samples Nn counted in the ranges beyond the range of levels Fx are clipped to a number of bits which is close to those of the samples counted in the normality range Fx.

4. The method of detecting and processing pulsed signals according to claim 1, wherein the grading of a sample in the ranges Fx of levels is performed by taking account only of the highest weight of the digitized sample without taking account of the bits of lower weight.

5. The method of detecting and processing pulsed signals according to claim 4, wherein a normality threshold
Sn=(Nn/P).100 expressed as a percentage of the number P of samples of the packet K is chosen equal to 80%.

6. The method of detecting and processing pulsed signals according to claim 5, wherein the range varies from the normality range Fn (or normality rank) by ΔF ranges of levels (margin) and one observes the quantity of samples graded beyond a number of ranges of sample levels Fd=Fn+ΔF, the range Fd being a detection rank and in that if the entirety of the samples Nd graded beyond the detection rank Fd is greater than a second threshold Sd, Sd being a detection threshold, in percent of the P samples of the packet K of samples, then the coded signal is considered to contain an intermittent component and in that if the second threshold Sd is not exceeded, the coded signal will be considered to contain only "continuous" components.

7. The method of detecting and processing pulsed signals according to claim 6, wherein in cases where the second detection threshold Sd is exceeded, such that the presence of samples of a pulsed signal has been detected, the samples Nd are brought down, at the output of the processing, to the bottom part of the histogram, to levels which will make it seem that the coded signal now contains only "continuous" components.

8. The method of detecting and processing pulsed signals according to claim 7, wherein the samples Nd are brought down, at the output of the processing, to the bottom part of the histogram by clipping the entirety of the samples Nd to a lower number of bits, close to the number of bits of the samples of the normality rank Fn, i.e. for example those of Fn or Fn+1.

9. The method of detecting and processing pulsed signals according to claim 1, wherein the entirety of the digitized samples Nd counted in the ranges beyond the range of levels Fd, are clipped to a lower number of bits than those that can be supplied by the digital/analog converter of the receiver.

10. The method of detecting and processing pulsed signals according to claim 1, wherein the grading of a sample in the ranges Fx of levels is performed by taking account only of the highest weight of the digitized sample without taking account of the bits of lower weight.

11. The method of detecting and processing pulsed signals according to claim 2, wherein the grading of a sample in the ranges Fx of levels is performed by taking account only of the highest weight of the digitized sample without taking account of the bits of lower weight.

12. The method of detecting and processing pulsed signals according to claim 3, wherein the grading of a sample in the ranges Fx of levels is performed by taking account only of the highest weight of the digitized sample without taking account of the bits of lower weight.

13. The method of detecting and processing pulsed signals according to claim 5, wherein the range varies from the normality range Fn (or normality rank) by ΔF ranges of levels (margin) and one observes the quantity of samples graded beyond a number of ranges of sample levels Fd=Fn+ΔF, the range Fd being a detection rank and in that if the entirety of the samples Nd graded beyond the detection rank Fd is greater than a second threshold Sd, Sd being a detection threshold, in percent of the P samples of the packet K of samples, then the coded signal is considered to contain an intermittent component and in that if the second threshold Sd is not exceeded, the coded signal will be considered to contain only "continuous" components.

* * * * *